UNITED STATES PATENT OFFICE.

ANTON LEDERER, OF VIENNA, AUSTRIA, ASSIGNOR TO WESTINGHOUSE LAMP COMPANY, A CORPORATION OF PENNSYLVANIA.

PROCESS FOR THE MANUFACTURE OF WIRES FROM REFRACTORY MATERIALS.

1,273,506. Specification of Letters Patent. Patented July 23, 1918.

No Drawing. Application filed May 16, 1914. Serial No. 838,949.

*To all whom it may concern:*

Be it known that I, ANTON LEDERER, a subject of the Emperor of Austria, and a resident of Vienna, Austria, have invented certain new and useful Improvements in the Processes for the Manufacture of Wires from Refractory Materials, of which the following is a specification.

My invention relates to the manufacturing processes by which bodies of tungsten or similar refractory material are brought into the form of the wires suitable for use as filaments in incandescent electric lamps, and particularly to the means for protecting such bodies from oxidation and lubricating the same during the various stages of the manufacturing process.

For the purpose of obtaining such wires, ingots of tungsten or the like refractory material are subjected to various operations, such as swaging, rolling or drawing, at an elevated temperature. As such metals are readily oxidizable in the air, it is easily possible that their ductility is diminished thereby to such an extent that they finally become brittle and break or split so that they cannot be worked any more. It has been proposed to cover the material during the process of manufacture with a coating of various materials, such as graphite, or of such difficultly fusible metals as silver, copper, gold, platinum, steel, iron or nickel which coating serves as a protection against oxidation and also as a lubricant for facilitating the manipulations during the wire drawing process. Such coating, however, had the disadvantage that, owing to the decomposition of the lubricant at the elevated temperature to which the material must be heated, more or less residuary matter was left on the bodies of refractory material, which impaired their ductility and had other detrimental effects thereon. Moreover the use of a lubricant of the above description necessitated the employment of a quantity considerably in excess of that needed for preventing oxidation and lubricating the refractory bodies.

My invention aims to overcome these difficulties by the use of a material for protecting the bodies of refractory metal from oxidation and for lubricating them during the process of manufacture which can be subsequently removed from the refractory bodies without leaving any solid residue whatever. For this purpose, I employ a coating of volatile materials, such as sulfur, selenium, tellurium, or the like. Such coating, I may obtain by a variety of methods. Thus, for instance: I may introduce ingots of tungsten or of like material into an atmosphere of gases or vapors of sulfur, selenium or tellurium or their compounds, such as for instance, hydrogen sulfid, selenium hydrid or tellurium hydrid. These gases or vapors may be heated to such a degree that they decompose and thereby the bases are deposited upon the ingots.

The deposits formed on the ingots by proceeding in such a manner consist of very finely divided sulfur, selenium, tellurium, etc., and the ingots are completely and uniformly coated thereby. Moreover, as the deposition takes place from gases or vapors, the material deposited is of great purity.

I may also produce a deposit such as described by passing the ingots through the inner part of a very widely spread flame, obtained by burning the above mentioned gases, such as, for instance, hydrogen sulfid, in the air.

A further method of carrying out my invention consists in obtaining the protective and lubricating deposit upon the ingots or wires by passing the same through molten plastic sulfur or the like, although in that case the deposit is not as uniform as is the case when gases or vapors are being employed as the source of the deposit. Thus, I may, for instance apply sulfur to the drawing dies in which case the temperature of the dies during the drawing process is sufficient to melt the sulfur. It, therefore, coats the wire and in consequence of its viscosity, it also acts as a lubricant.

Having thus described my invention, I claim:

1. The process of manufacturing wire from refractory metallic bodies, consisting in covering such bodies with a non-metallic substance which is readily volatile without a residue, drawing the body while so covered and protected and afterward removing the said substance by heat.

2. As a step in the process of manufacturing wire from tungsten, consisting in covering tungsten bodies with a substance which is readily volatile without a residue at a temperature not in excess of 2000° C., and which serves to protect the body against oxidation and also as a lubricant.

3. In the process of manufacturing wire from refractory metallic bodies, the step consisting of covering such bodies with an element belonging to the sulfur group of elements, the said element serving as a protection against oxidation and also as lubricant.

4. In the process of manufacturing wire from tungsten, the step consisting of covering bodies of tungsten with an element belonging to the sulfur group of elements, the said element serving as a protection against oxidation and also as lubricant.

5. In the process of manufacturing wire from refractory metallic bodies, the step consisting of covering such bodies with sulfur, the said sulfur serving as a protection against oxidation and also as lubricant.

6. In the process of manufacturing wire from tungsten, the step consisting of covering bodies of tungsten with sulfur, the said sulfur serving as a protection against oxidation and also as lubricant.

7. The process of manufacturing wire from refractory metal bodies, consisting in covering such bodies with a substance which vaporizes at a temperature lower than that at which it combines with said refractory metal, drawing the body while so covered and protected and afterward removing the said substance by heat.

8. The step in the process of manufacturing wire from tungsten, which consists in covering tungsten bodies with a substance which readily volatilizes at a temperature below that at which it combines with tungsten, said substance serving to protect said body against oxidation and also as a lubricant.

9. The process of manufacturing wire from refractory metal bodies, consisting in covering such bodies with a substance the compounds of which with the material of such bodies are unstable at the volatilization temperature of said substance, drawing the body while so covered and protected and afterward removing said substance by heat.

10. The step in the process of manufacturing wire from tungsten, which consists in covering tungsten bodies with a substance the compounds of which with tungsten are unstable at the volatilization point of said substance, said substance serving to protect said body against oxidation and also as a lubricant.

In testimony whereof I have hereunto subscribed my name this 23rd day of April, 1914.

ANTON LEDERER.

Witnesses:
 AUGUST FUGGER,
 ADA MARIA BERGER.